(12) United States Patent
Koskinen et al.

(10) Patent No.: US 12,041,498 B2
(45) Date of Patent: Jul. 16, 2024

(54) CONTROLLING OPERATIONS OF AN INTEGRATED ACCESS AND BACKHAUL (IAB) NODE

(71) Applicant: Nokia Solutions and Networks Oy, Espoo (FI)

(72) Inventors: Henri Koskinen, Espoo (FI); Esa Malkamäki, Espoo (FI); Thomas Höhne, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 380 days.

(21) Appl. No.: 17/624,077

(22) PCT Filed: Jun. 17, 2020

(86) PCT No.: PCT/FI2020/050433
§ 371 (c)(1),
(2) Date: Dec. 30, 2021

(87) PCT Pub. No.: WO2021/032905
PCT Pub. Date: Feb. 25, 2021

(65) Prior Publication Data
US 2022/0361067 A1 Nov. 10, 2022

Related U.S. Application Data

(60) Provisional application No. 62/888,046, filed on Aug. 16, 2019.

(51) Int. Cl.
*H04W 36/00* (2009.01)
*H04W 88/08* (2009.01)

(52) U.S. Cl.
CPC .. *H04W 36/00837* (2018.08); *H04W 36/0061* (2013.01); *H04W 88/08* (2013.01)

(58) Field of Classification Search
CPC ....... H04W 36/00837; H04W 36/0061; H04W 88/08; H04W 36/08; H04W 36/0055; H04W 84/047; H04W 88/085; H04B 7/15528
See application file for complete search history.

(56) References Cited

U.S. PATENT DOCUMENTS

2021/0013959 A1* 1/2021 Yuan ............... H04B 7/15571
2021/0045170 A1* 2/2021 Luo ...................... H04W 36/06
(Continued)

FOREIGN PATENT DOCUMENTS

WO 2019/142064 A1 7/2019
WO 2019/154060 A1 8/2019

OTHER PUBLICATIONS

"Revised WID: Integrated Access and Backhaul for NR", 3GPP TSG RAN meeting #84, RP-191558, Agenda: 9.4.11, Qualcomm, Jun. 3-6, 2019, 7 pages.
(Continued)

*Primary Examiner* — Abdullahi Ahmed
(74) *Attorney, Agent, or Firm* — Robert P. Michal, Esq.; Carter, DeLuca & Farrell LLP

(57) ABSTRACT

Systems, methods, apparatuses, and computer program products for controlling operations of an integrated access and backhaul (IAB) node are proposed. In some embodiments, an integrated access and backhaul node may receive a message indicating that a handover of the integrated access and backhaul node is to be performed; and stop admission of new user equipment to an active radio cell of the integrated access and backhaul node based on the message received.

1 Claim, 11 Drawing Sheets

(56) References Cited

U.S. PATENT DOCUMENTS

| | | | |
|---|---|---|---|
| 2021/0051549 A1* | 2/2021 | Akl | H04W 48/12 |
| 2021/0329629 A1* | 10/2021 | Xu | H04W 72/542 |
| 2021/0352666 A1* | 11/2021 | Sirotkin | H04W 72/0446 |
| 2022/0022121 A1* | 1/2022 | Eklöf | H04W 36/00837 |
| 2022/0141732 A1* | 5/2022 | Wu | H04W 36/0064 370/331 |
| 2022/0182905 A1* | 6/2022 | Xu | H04W 36/30 |

OTHER PUBLICATIONS

"CR to 38.300 on Integrated Access and Backhaul for NR", 3GPP TSG-RAN WG2 Meeting #105bis, R2-1905476, Qualcomm, Apr. 8-12, 2019, 8 pages.

"3rd Generation Partnership Project; Technical Specification Group Radio Access Network; NG-RAN; Architecture description (Release 15)", 3GPP TS 38.401, V15.5.0, Mar. 2019, pp. 1-39.

International Search Report and Written Opinion received for corresponding Patent Cooperation Treaty Application No. PCT/FI2020/050433, dated Sep. 16, 2020, 16 pages.

"3rd Generation Partnership Project; Technical Specification Group Radio Access Network; NR; Study on Integrated Access and Backhaul; (Release 16)", 3GPP TR 38.874, V16.0.0 , Dec. 2018, pp. 1-111.

"Discussion on network-controlled IAB migration handling", 3GPP TSG RAN WG3 Meeting #104, R3-192519, Agenda: 13.3.2.2, ZTE, May 13-17, 2019, 5 pages.

* cited by examiner

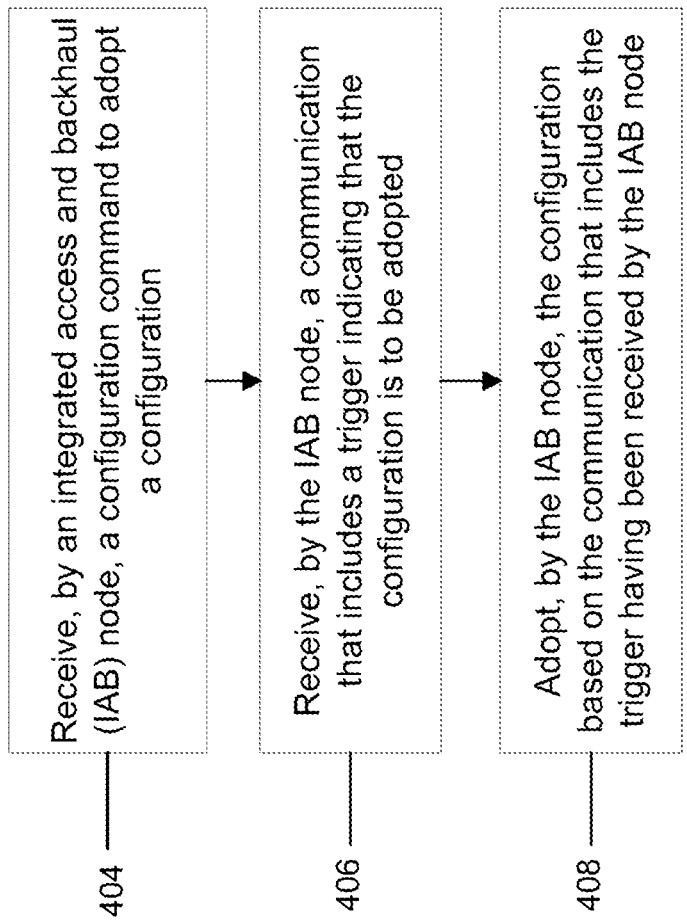

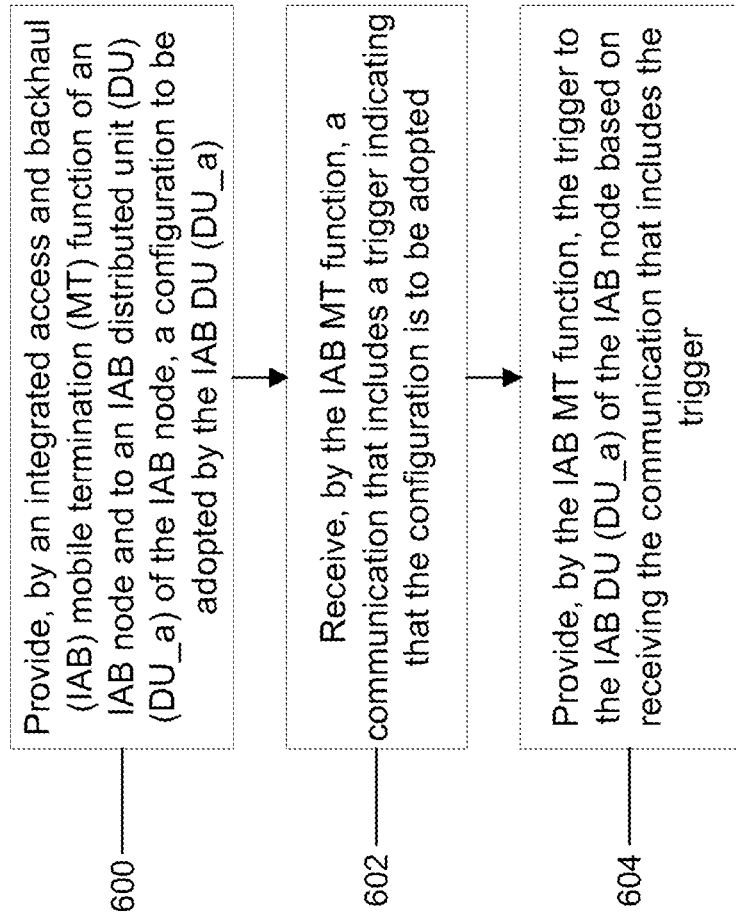

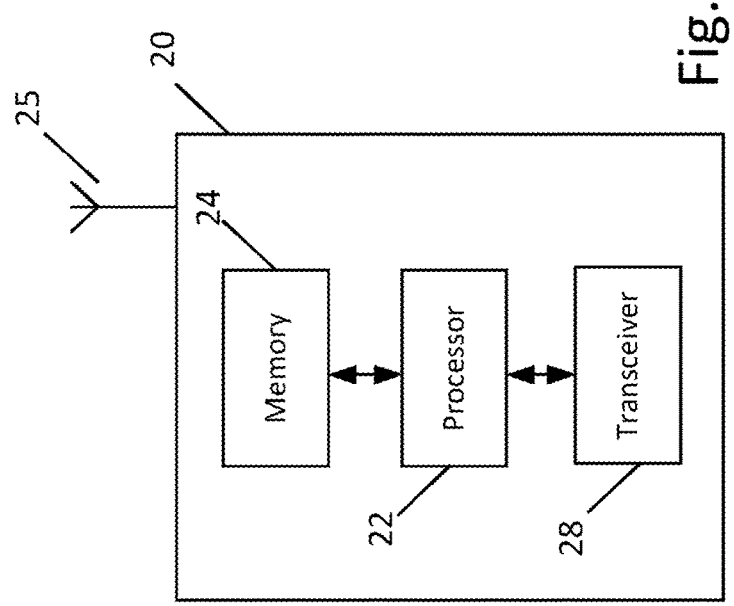
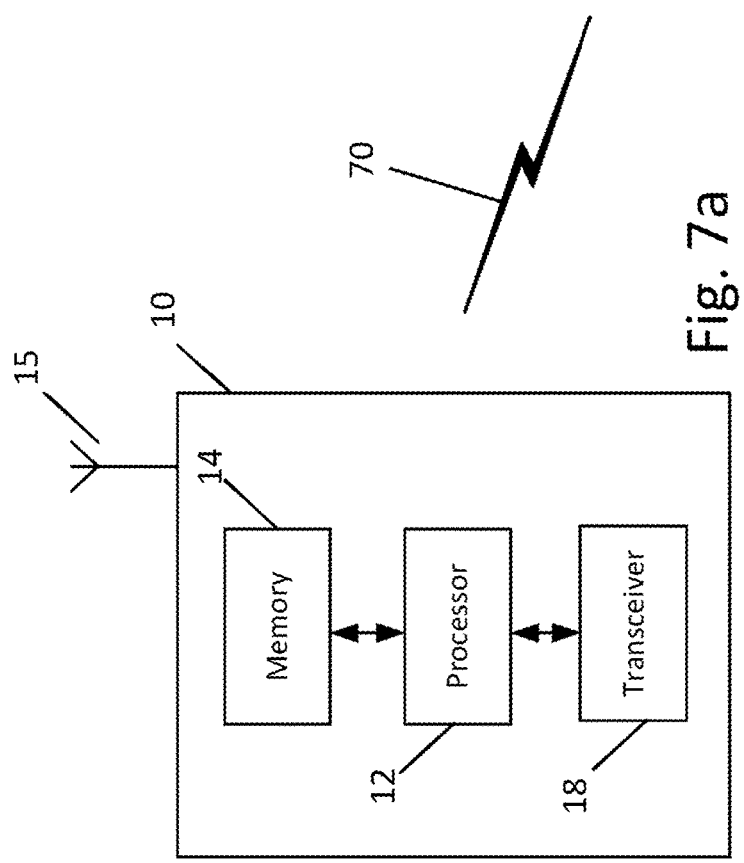

CONTROLLING OPERATIONS OF AN INTEGRATED ACCESS AND BACKHAUL (IAB) NODE

RELATED APPLICATION

This application was originally filed as PCT Application No. PCT/FI2020/050433 on Jun. 17, 2020, which claims priority from U.S. application 62/888,046, filed Aug. 16, 2019, the contents of which are hereby incorporated in their entirety.

TECHNICAL FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for controlling operations of an integrated access and backhaul (IAB) node.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In general, example embodiments of the present disclosure provide solutions for controlling operations of an integrated access and backhaul node.

In a first aspect, there is provided a method. The method may be implemented by an integrated access and backhaul node. The method comprises receiving a message indicating that a handover of the integrated access and backhaul node is to be performed; and stopping admission of new user equipment to an active radio cell of the integrated access and backhaul node based on the message received.

In some embodiments, the method may comprise determining that the handover is a handover from a first base station to a second base station; and the stopping admission of new user equipment may comprise stopping the admission based on the determination.

In some embodiments, the integrated access and backhaul node may comprise a first distributed unit function and a second distributed unit function.

In some embodiments, the admission of new user equipment may be stopped prior to stopping service for old user equipment already admitted to the active radio cell.

In a second aspect, there is provided another method. The method may be implemented by an integrated access and backhaul node. The method may comprise receiving a command to adopt a configuration conditionally; receiving a trigger indicating that the configuration is to be adopted; and adopting the configuration based on the trigger received. In some embodiments, the configuration may comprise an F1 application protocol configuration. In some embodiments, the configuration may be associated with stopping admission of new user equipment to an active radio cell of the integrated access and backhaul node.

In some embodiments, the integrated access and backhaul node may receive the trigger by receiving an indication that a handover is to be performed by a mobile termination function of the integrated access and backhaul node.

In some embodiments, the trigger may comprise a trigger identifier associated with the configuration to be adopted. In some embodiments, the trigger may be included in a command received by a mobile termination function of the integrated access and backhaul node. In some embodiments, the trigger may be received in at least one of a radio resource control message, a backhaul adaptation protocol layer message, or a media access control control element.

In a third aspect, there is provided an apparatus. The apparatus comprises at least one processor and at least one memory comprising computer program code. The at least one memory and computer program code are configured, with the at least one processor, to cause the apparatus at least to perform at least the following: receiving a message indicating that a handover of the apparatus is to be performed; and stopping, based on the message received, admission of new user equipment to an active radio cell of the apparatus.

In a fourth aspect, there is provided another apparatus. The apparatus comprises at least one processor and at least one memory comprising computer program code. The at least one memory and computer program code are configured, with the at least one processor, to cause the apparatus at least to perform the following: receiving a command to adopt a configuration conditionally; receiving a trigger indicating that the configuration is to be adopted; and adopting the configuration based on the trigger received.

In a fifth aspect, there is provided a further apparatus. The apparatus comprises means for: receiving a message indicating that a handover of the apparatus is to be performed; and stopping, based on the message received, admission of new user equipment to an active radio cell of the apparatus.

In a sixth aspect, there is provided an apparatus which comprises means for: receiving a command to adopt a configuration conditionally; receiving a trigger indicating that the configuration is to be adopted; and adopting the configuration based on the trigger received.

In a seventh aspect, there is a computer readable medium comprising program instructions for causing an apparatus to perform a method according to the first aspect or second aspect.

BRIEF DESCRIPTION OF THE DRAWINGS

For proper understanding of example embodiments, reference should be made to the accompanying drawings, wherein:

FIG. 4b illustrates an example flow diagram of a method, according to some embodiments described herein;

FIG. 6a illustrates an example flow diagram of a method, according to some embodiments described herein;

FIG. 7a illustrates an example block diagram of an apparatus, according to an embodiment; and FIG. 7b illustrates an example block diagram of an apparatus, according to another embodiment.

DETAILED DESCRIPTION

Figure 1:
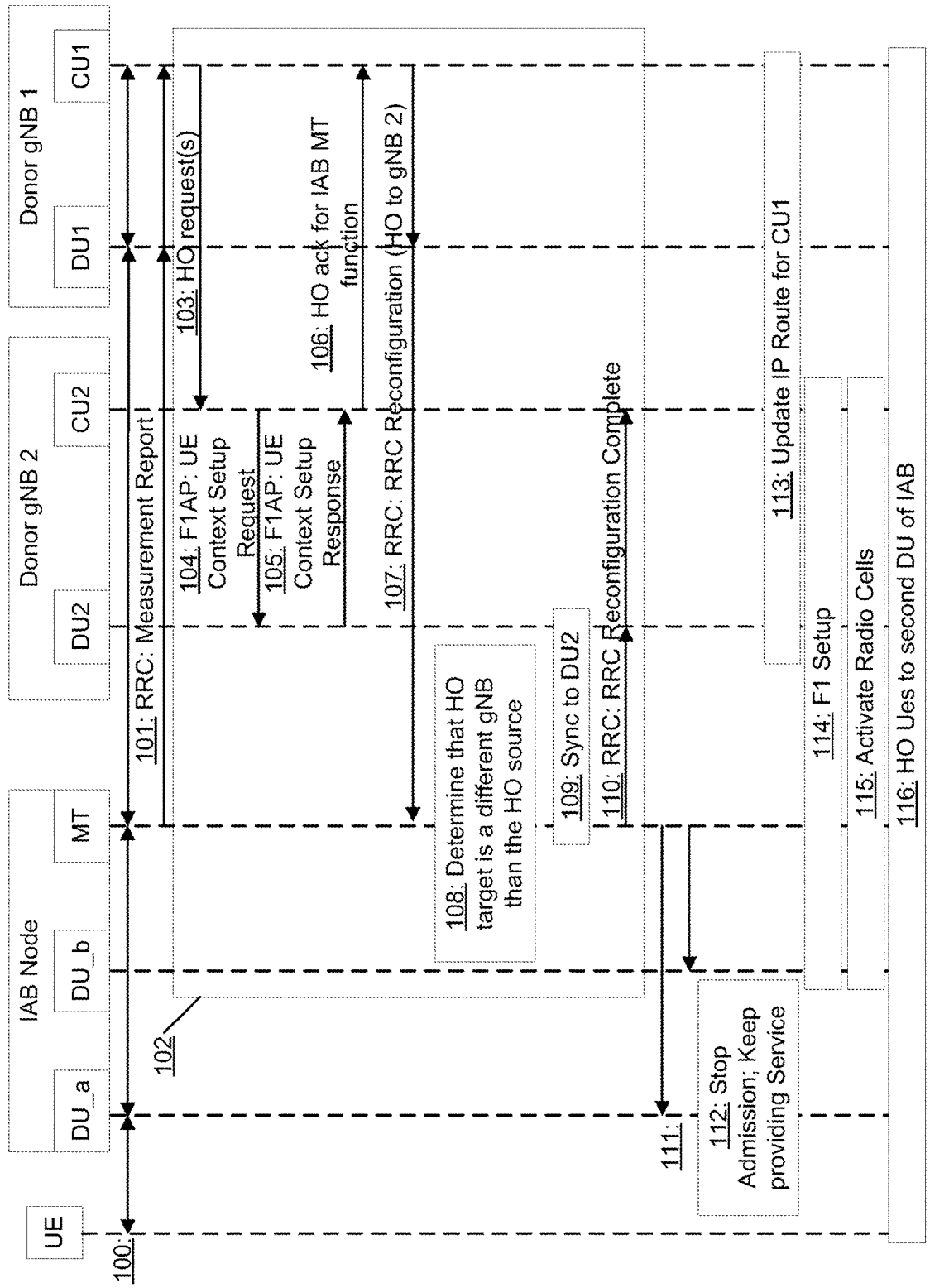
FIG. 1 illustrates an example signaling diagram of a procedure, according to some embodiments described herein.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for controlling operations of an IAB node, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Integrated access and backhaul (IAB) is an ongoing Rel-16 3GPP work item, preceded by a Rel-15 study item. In the ongoing Rel-16 work, even though IAB nodes are assumed stationary, network-controlled topology adaptation is based on handover procedure. Furthermore, mobile IAB nodes are an expected Rel-17 extension.

IAB enables wireless relaying for NR access by using NR for backhauling. The relaying node is referred to as the IAB-node. The terminating node of NR backhauling on the network side is referred to as the IAB-donor gNB, which represents a gNB with additional functionality to support IAB. Backhauling can occur via a single hop or via multiple hops. The IAB-node supports gNB-DU functionality 1) to terminate NR access interface to UEs and IAB-nodes, and 2) to support F1 protocol to the gNB-CU on the IAB-donor. The neighbour IAB node on the DU's NR access interface is also referred to as a child node. The architecture and the F1 interface for a functional split are defined in 3GPP TS 38.401.

The IAB-node also supports the NR Uu radio interface, referred to as mobile termination (MT) functionality, 1) to connect to the DU of another IAB-node or the IAB-donor, and 2) to connect to the gNB-CU on the IAB-donor via RRC. The neighbour node on the MT's NR Uu radio interface is also referred to as a parent node. When the donor gNB of an IAB node changes (due to mobility or for other reasons), various operations may take place.

As a first operation, the F1 interface may be set up between the IAB node and the target gNB. Because the F1-Control plane (F1-C) does not support mobility, prior work on IAB node mobility has envisioned the IAB node hosting one logical DU (which may be referred to as DU_a) with an F1 interface with the handover-source gNB-CU and another logical DU (which may be referred to as DU_b) with an F1 interface with the target gNB-CU. Some embodiments described herein may make similar assumptions. While setting up the F1 interface with the target gNB-CU can take place either before or after the handover of the IAB node, doing it before has delay-saving potential on the overall procedure. Doing it before handover seems technically feasible over a concatenation of 1) the IAB node's radio backhaul to the source Donor gNB's DU (Donor DU1), and 2) IP routing between that source Donor gNB-DU and the target Donor gNB-CU.

As a second operation, the logical DU interfacing the target gNB-CU may need to set up new radio cell(s) with parameters, such as physical cell identity (PCI) and NR cell global identity (CGI) configured by the target gNB. For instance, the PCI configured by the source gNB may not be suitable to the target gNB. For this reason, after handover of the IAB node, the UEs/MTs served by that IAB node may need to be promptly handed over from the old radio cell(s) provided by the IAB node and configured by the source gNB, to the new radio cell(s).

During the above described operations, old radio cells of an IAB node may be open to connections from new UEs. After handover of the IAB MT (i.e., the MT function of the IAB node), new UE connections formed over the IAB node's old radio cells (and hence the F1 interface between the IAB node DU and the source gNB-CU) may use resources of both the target gNB (namely its DU) and the source gNB (CU), making admission control for such connections near-impossible. The IAB node may not be able to cease providing the old cell immediately after the handover because there is a period of time between 1) the handover of the IAB MT, and 2) when all the UEs/MTs served by the IAB node have been handed over to the new radio cells (provided by the DU connected to the target Donor gNB-CU) and the IAB node can cease providing the old radio cells. Thus, there may be currently no way to ensure that the IAB DU (i.e., the DU function of the IAB node) controlling the old cell(s) ceases to admit new UEs at the moment of the IAB handover.

Some other solutions with a single (physical and logical) DU in the IAB node provide that when the migrating IAB-node's MT connects to the target CU during Inter-gNB handover, the IAB-node's DU has to discontinue service since it loses connectivity to its source CU. Consequently, UEs connected to this DU observe radio link failure (RLF). This implies a service interruption, possibly on the order of seconds.

Some embodiments described herein provide methods for controlling operations of an IAB node, including (but not limited to) methods for activation of a previous configuration of a DU in an IAB node. In addition, some embodiments provide various operations for an IAB node that close old radio cells of the IAB node from connections of new UEs and ensure that the IAB DU controlling the old cell(s) ceases to admit new UEs at the moment of the IAB handover. For example, an IAB MT of an IAB node may indicate to an IAB DU of the IAB node that an inter-base station (BS) (e.g., inter-gNB) handover is to be performed. The IAB DU may then stop admitting new UEs to an active radio cell (e.g., prior to performing the inter-BS handover and/or prior to stopping providing service to UEs already admitted to an active radio cell). Therefore, some embodiments may conserve resources of both the target gNB and the source gNB that would otherwise be consumed via use of other techniques. In addition, some embodiments reduce or eliminate a need for the radio link failure of other techniques, thereby reducing or eliminating service interruption, which improves operations of a network.

In the following, reference is made to an IAB node MT becoming aware that it is being handed over to a cell of another BS, as opposed to another cell of the same BS. There are different ways for how the MT can become aware that the handover is an inter-BS handover. In one variant, the MT has been performing CGI reporting as part of its measurement configuration, thus being able to link the CGI with the PCI (which is part of the HO command, but not the CGI). In another variant, the handover-source CU has informed the MT earlier about CGI-PCI associations. This informing could be done with proprietary signaling, or with signaling that still needs to be standardized. In another variant, the HO command contains an indicator that the handover is inter-BS. This indicator may need to be standardized. In another variant, the MT realizes that an inter-gNB HO has happened following the completion of the HO, when a change of security keys is effected.

FIG. 1 illustrates an example signaling diagram of a procedure, according to some embodiments described herein. FIG. 1 shows various network entities, such a UE, an IAB node that includes a first DU (shown as a DU_a), a second DU (shown as a DU_b), and an MT function, a donor gNB 1 (e.g., a source gNB) that includes a CU (shown as CU1) and a DU (shown as DU1), and a donor gNB 2 (e.g., a target gNB) that includes a CU (shown as CU2) and a DU (shown as DU2). The IAB MT is first connected to the Donor gNB 1, i.e., to DU1 and CU1, and the UE is connected to the DU_a of the IAB node.

As shown at 100, some of the network entities may exchange data. For example, some network entities may exchange data via a general packet radio service (GPRS) tunneling protocol user plane (GTP-U) (e.g., the DU_a and the CU1 may exchange data via a GTP-U tunnel). As shown at 101, the MT function may provide an RRC measurement report to the CU1 via the DU1.

As shown at 102, various network entities may perform various operations to implement an IAB handover to DU2 of the donor gNB 2. As shown at 103, the IAB handover may include the CU1 providing various handover (HO) requests to the CU2. For example, the CU1 may provide a handover request for the MT function and a handover request for the UE (or for multiple UEs if present). As shown at 104, the CU2 may provide an F1 application protocol (F1AP) message to the DU2. For example, the F1AP message may be a UE context setup request. In some embodiments, the UE context setup request may be for the IAB MT. As shown at 105, the DU2 may provide an F1AP message to the CU2. For example, the F1AP message may be a UE context setup response.

As shown at 106, the CU2 may provide a HO acknowledge (ack) to the CU1 for the IAB MT function. As shown at 107, the CU1 may provide an RRC reconfiguration message to the MT function via the DU1. For example, the RRC reconfiguration message may indicate a handover to another gNB (gNB 2). As shown at 108, the MT function of the IAB node may determine that the HO target (e.g., the donor gNB 2) is a different gNB than the HO source (e.g., the donor gNB 1). As shown at 109, the MT function may synchronize to transmissions of the DU2, for example, by using a random access procedure. As shown at 110, the MT function may provide an RRC reconfiguration complete message to the CU2 via the DU2.

As shown at 111, after some network entities perform the IAB handover to the DU2 shown by 102, the IAB MT function may perform internal signaling. The MT function may provide commands to the DU_a and the DU_b to cause the DU_a and the DU_b to perform various operations. For example, at 112, based on a command from the MT function, the DU_a may stop admission of new UEs to an active radio cell and may keep providing service to UEs associated with the active radio cell.

As shown at 113, the CU2, the CU1, and the DU2 may communicate to update an Internet protocol (IP) route for the CU1 and the DU2 in order for the CU1 to continue to be capable of communicating with the DU_a. After a handover, the CU1 may continue to send packets to the IP address of the DU_a. Updating an IP route may depend on what information is needed to route IP packets via the DU2 instead of via the DU1. If there is a separate IP router, only the IP router may need to be updated. Alternatively, if each network entity performs IP routing itself, then updates may be needed in each network entity. As shown at 114, the DU_b may communicate with the CU2, via the MT function and the DU2, to perform F1 setup. As shown at 115, the CU2 and the DU_b may communicate (via the DU2 and the MT) to activate new radio cells of the DU_b. As shown at 116, the various network entities may communicate to handover UEs to the second DU (the DU_b) of the IAB, and from the CU1 to the CU2.

As described above, FIG. 1 is provided as an example. Embodiments are not limited to the example of FIG. 1.

Figure 2:
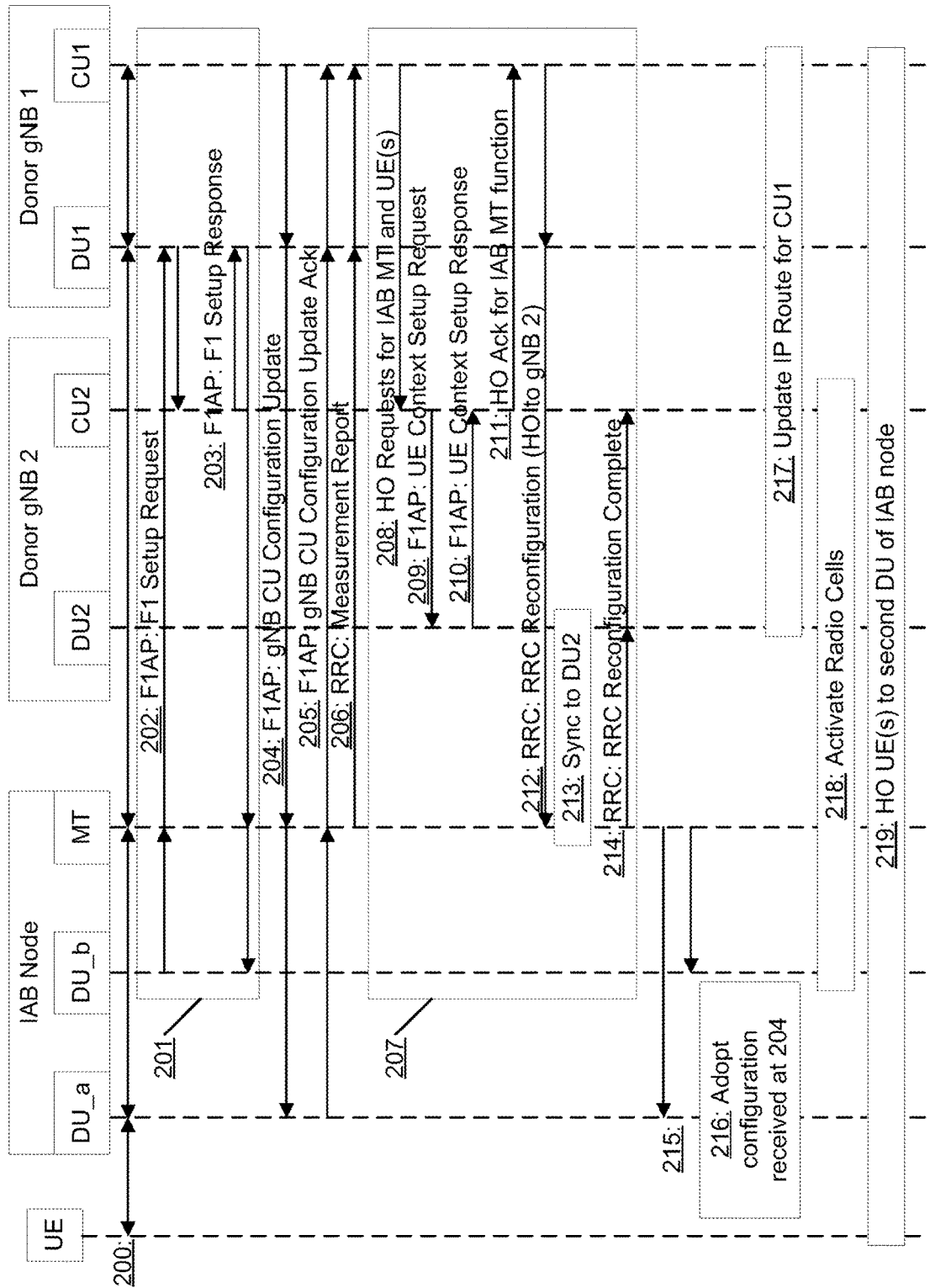
FIG. 2 illustrates an example signaling diagram of a procedure, according to some embodiments described herein.

FIG. 2 illustrates an example signaling diagram of a procedure, according to some embodiments described herein. FIG. 2 shows the same network entities described above with respect to FIG. 1. As shown at 200, some of the various network entities may communicate to exchange data in a manner similar to that described above at 100.

As shown at 201, the various network entities may perform operations to implement an F1 setup between the DU_b and the CU2. As shown at 202, the DU_b may provide an F1AP message to the CU2 via the MT function and the DU1. For example, the F1AP message may be an F1 setup request. As shown at 203, the CU2 may provide an F1AP message to the DU_b via DU1 and the MT function. For example, the F1AP message may be an F1 setup response. This assumes that the DU_b has been allocated an IP address (not shown in the figure), that IP routing is used between CU2 and DU1, and that backhaul adaptation protocol (BAP) layer routing is used between DU1 and the MT function of the IAB node.

As shown at 204, after the various network entities implement the F1 setup, the CU1 may provide a gNB CU configuration update to the DU_a as an F1AP message. For example, the CU1 may provide the F1AP message via the DU1 and the MT function. In some embodiments, the configuration update may prevent access of new UEs to radio cells of the DU_a conditional to completing a next handover to another gNB (e.g., conditional to receiving a RRC reconfiguration message indicating inter-gNB handover). As shown at 205, the DU_a may provide a gNB CU configuration update ack to the CU1 as an F1AP message. For example, the DU_a may provide the F1AP message via the MT function and the DU1.

As shown at 206, the MT function may provide a RRC measurement report to the CU1 via the DU1. As shown at 207, some of the network entities may perform various operations to implement an IAB handover to the DU2. As shown at 208, the CU1 may provide handover requests for the IAB MT function and the UEs to the CU2. As shown at 209, the CU2 may provide a UE context setup request for the IAB node MT to the DU2 as an F1AP message. As shown at 210, the DU2 may provide a UE context setup response to the CU2 as an F1AP message. As shown at 211, the CU2 may provide a handover ack for the IAB MT to the CU1.

As shown at 212, the CU1 may provide an RRC reconfiguration message to the IAB MT function via the DU1. The RRC reconfiguration message may indicate a handover to another gNB. As shown at 213, the IAB MT function may synchronize to transmissions of the DU2, for example, by random access procedure. As shown at 214, the MT function may provide an RRC reconfiguration complete message to the CU2 via the DU2.

As shown at 215, after the IAB handover to the DU2, the IAB MT may perform internal signaling to cause one or more of the DUs of the IAB node to adopt a previously provided configuration. For example, the IAB MT may perform internal signaling with the DU_a and/or the DU_b. As shown at 216, the DU_a may adopt the configuration received at 204. For example, the configuration may cause the DU_a to stop admitting new UEs to an active radio cell and/or to keep providing service to UEs already admitted to the active radio cell. As shown at 217, the CU2, the CU1, and the DU2 may communicate with each other to update an IP route for the CU1 and the DU2 in a manner similar to that described with respect to operation 113 of FIG. 1. As shown at 218, the CU2 and the DU_b may communicate (via the MT and the DU2) with each other to activate one or more new radio cells. Alternatively, the successful HO of the IAB MT to CU2 (operations 214 and 215) may activate the cells in DU_b according to the configuration received in operation 204. As shown at 219, various network entities shown in FIG. 2 may communicate with each other to handover UE(s) to the second DU of the IAB node. For example, the various network entities may communicate to handover one or more UEs to the DU_b of the IAB node.

As described above, FIG. 2 is provided as an example. Embodiments are not limited to the example of FIG. 2.

Figure 3A:
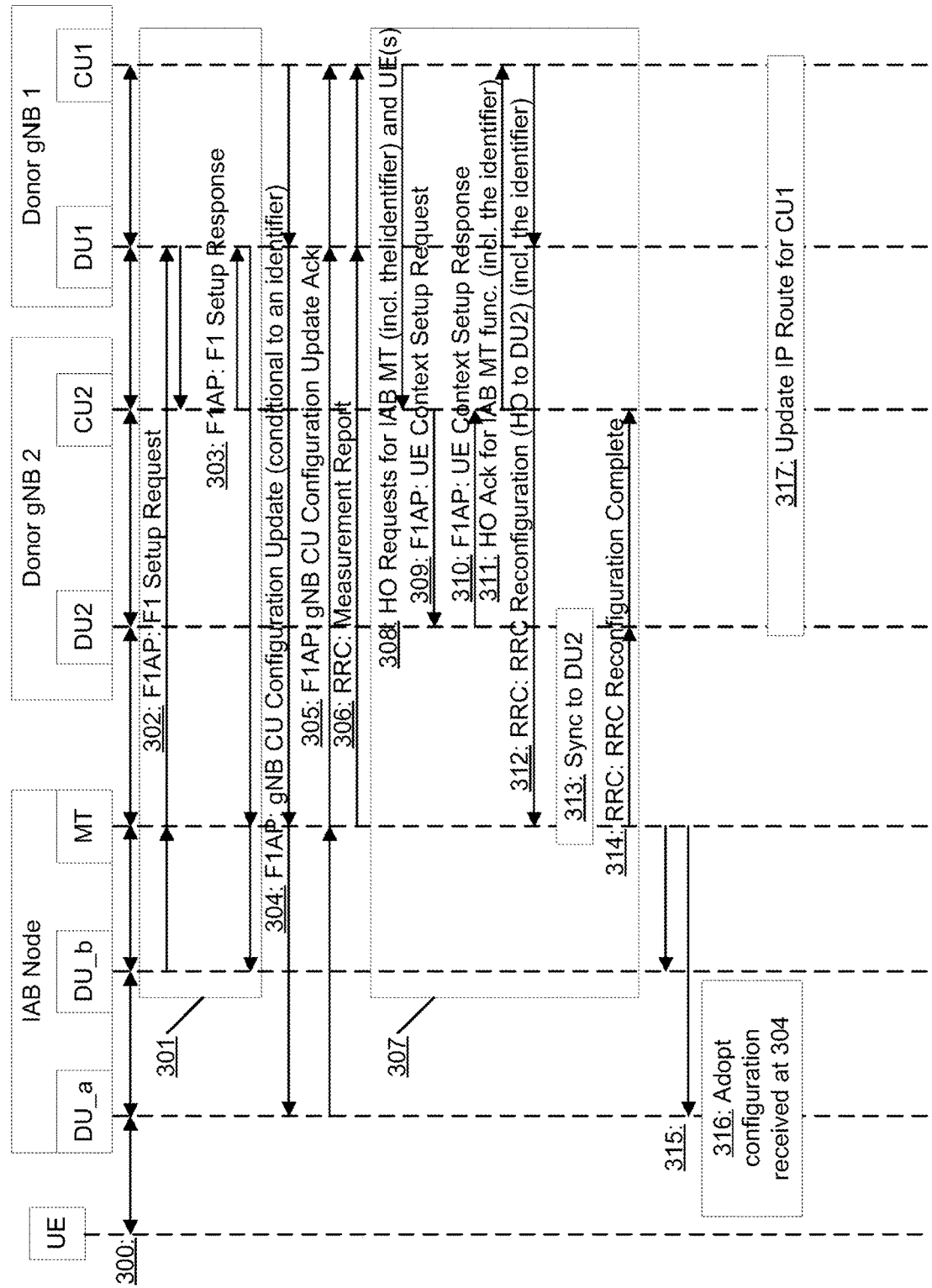
FIGS. 3a and 3b illustrate example signaling diagrams of a procedure, according to some embodiments described herein.
Figure 3B:
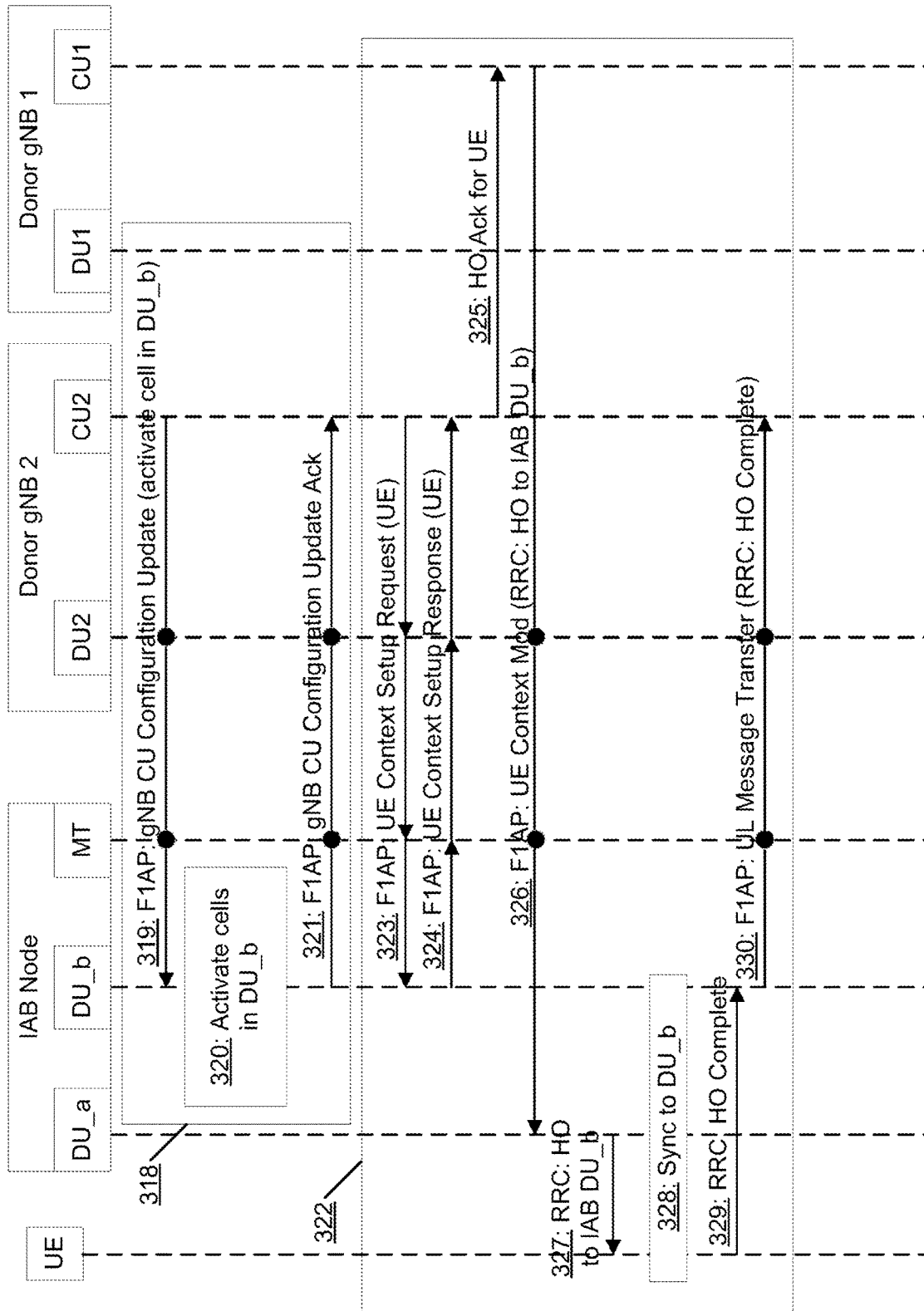

FIGS. 3a and 3b illustrate an example signaling diagram of a procedure, according to some embodiments described herein. FIGS. 3a and 3b show the same network entities described above with respect to FIG. 1. As shown at 300 through 317, the various network entities may perform operations similar to that described above with respect to operations 200 through 217 of FIG. 2, except that the operations shown at 300 through 317 may use one or more identifiers to trigger adoption of corresponding configurations. For example, operations 302 and 303 in FIG. 3a may be similar to operations 202 and 203 in FIG. 2, and operations 309 and 310 in FIG. 3a may be similar to operations 209 and 210 in FIG. 2, respectively.

Use of the identifier is detailed with respect to particular operations. At 304, the gNB CU configuration update may identify one or more configurations that may be conditionally adopted based on receipt of corresponding identifiers. With respect to the operations shown at 304, the F1AP configuration may be taken into use when a condition triggers. The condition trigger may include reception of the identifier, described above, via the IAB MT. Alternatively, or in addition, for example, at 303, the F1 Setup Response may identify one or more configurations that may be conditionally adopted based on receipt of corresponding identifiers. In addition, at 308, the CU1 provides a handover request for the IAB MT function and the UEs to the CU2. The handover request may include a particular identifier that corresponds to a particular configuration to be adopted. With respect to the operations shown at 308, the identifier may be provided to the target gNB-CU (CU2) for inclusion into the RRC Reconfiguration message to be sent to the IAB MT function. Further, at 311, the handover ack may include information that confirms the identifier included in the handover request. With respect to the operations shown at 311, the identifier may be included into the RRC message (HO command) to be sent to the IAB MT function.

In addition, at 312, the RRC reconfiguration message may include the identifier, so that the IAB MT can provide the identifier, at 315, to the DU_a and the DU_b. With respect to the operations shown at 312, the identifier may be sent to the IAB MT function. Alternatively, instead of having an explicit identifier sent in the RRC message, a given RRC message may be the trigger (e.g., reception of a HO command by the IAB MT function or reception of the HO command to a given cell or a HO command with security key change (done at inter-gNB HO) or a HO command indicating an inter-gNB handover may be the trigger).

With respect to the operations shown at 315-316, the IAB MT function may provide the trigger identifier to all DUs of the IAB node separately. In some embodiments, the operations shown at 315-316 may be performed after the operations shown at 312, in parallel to the operations shown at 313 and 314. With respect to the operations shown at 316, the identifier may trigger the conditional configuration received by DU_a at 304. In some embodiments, the identifier may trigger a conditional configuration in DU_b, for example, a conditional configuration received by DU_b at 303.

In this way, some embodiments described herein may use an explicit trigger indication (e.g., an identifier) sent in an RRC message to the IAB MT function or may use a specific RRC message sent to the IAB MT function in the same IAB node whose DU (DU_a in FIG. 3a) has received a F1AP pre-configuration to trigger adoption of a previously received configuration. Using RRC signaling to the IAB MT function to trigger an action pre-configured by F1AP in the IAB DU of the same IAB node is advantageous since both F1AP and RRC are terminated in the donor gNB-CU (CU1 in FIG. 3a). However, it should be appreciated that embodiments of the present disclosure are not limited to triggering a pre-configuration via a RRC signaling.

In some embodiments, instead of RRC signaling to the IAB MT, the trigger may be included via a backhaul adaptation protocol (BAP) layer message (e.g., a given BAP Control protocol data unit (PDU), which may contain an explicit trigger indication, for example, an identifier) or a media access control (MAC) layer message (e.g., a given MAC control element (MAC CE)). Since the donor gNB-CU (CU1) does not control BAP and MAC layers, it may be easier to configure a given BAP control PDU or a MAC CE without an explicit trigger identifier as the trigger. In the case that a BAP layer message is used to deliver a trigger to the IAB MT function, in addition or in the alternative to the operations shown at 312 sent by the CU1, the CU1 may send a trigger to the DU1, and the DU1 may send the triggering BAP message to the IAB MT function. In some embodiments, a BAP message as a trigger may facilitate activation by parent IABs in child IABs of configurations prepared previously by the CU1, without having to use RRC signaling. In the case of a child IAB MT function receiving the trigger, the child IAB may cause its DU(s) to send the trigger to the child IAB's own children via a BAP layer message.

Alternatively or in addition, some embodiments described herein may include the IAB DU (e.g., DU_b in FIG. 3*a*) sending a (conditional) F1AP configuration or request to the donor gNB-CU (e.g., CU2 in FIG. 3*a*) (e.g., rather than a gNB CU configuration update) and an RRC message received from the IAB MT function of the same IAB node may trigger/activate that configuration or request. For instance, a HO complete message received from an IAB MT function may trigger actions in the target donor gNB-CU (CU2 in FIG. 3*a*). For example, a F1AP pre-configuration sent by the IAB DU (DU_b in FIG. 3*a*) may be activated by the RRC message, or a F1AP response to a pending F1AP request may be sent.

Turning to FIG. 3*b*, at 318, various network entities may perform various operations to activate radio cells of the DU_b. As shown at 319, the CU2 may provide a gNB CU configuration update to the DU_b. The gNB CU configuration update may be an F1AP message. In addition, the gNB CU Configuration Update may be associated with activating one or more cells in the DU_b. As shown at 320, the DU_b may activate one or more cells. As shown at 321, the DU_b may provide a gNB CU configuration update ack to the CU2 via the MT function and the DU2.

As shown at 322, various network entities may perform operations to implement a handover of UE(s) to a second DU of the IAB (and a handover of UE(s) from CU1 to CU2). As shown at 323, the CU2 may provide a UE context setup request to the DU_b via the DU2 and the MT function. The UE context setup request may be an F1AP message. As shown at 324, the DU_b may provide a UE context setup response to the CU2 via the MT function and the DU2. The UE context setup response may be a F1AP message. As shown at 325, the CU2 may provide, to the CU1, a handover ack for a UE that is to be handed over from the CU1. This handover ack may be a response to a handover request received from CU1 for UE(s) (similar to that shown at 308 in FIG. 3*a*).

As shown at 326, the CU1 may provide, to the DU_a via the DU2 and the MT function, a UE context modification. The UE context modification may be a F1AP message and/or may trigger sending to the UE an RRC command to handover the UE to the DU_b. The F1AP message of operation 326 may be routed by IP routing between CU1 and DU2 and by BAP routing from DU2 to IAB MT. As shown at 327, the DU_a may provide an RRC message to the UE to handover the UE to the DU_b. As shown at 328, the UE may synchronize to transmissions of the DU_b, for example, by using random access procedure. As shown at 329, the UE may provide, to the DU_b, an RRC handover complete message. As shown at 330, the DU_b may provide an F1AP UL message transfer to the CU2 via the MT function and the DU2. The F1AP message may carry the RRC handover complete message from the UE.

As described above, FIGS. 3*a* and 3*b* are provided as examples. Embodiments are not limited to the examples of FIGS. 3*a* and 3*b*.

Figure 4A:
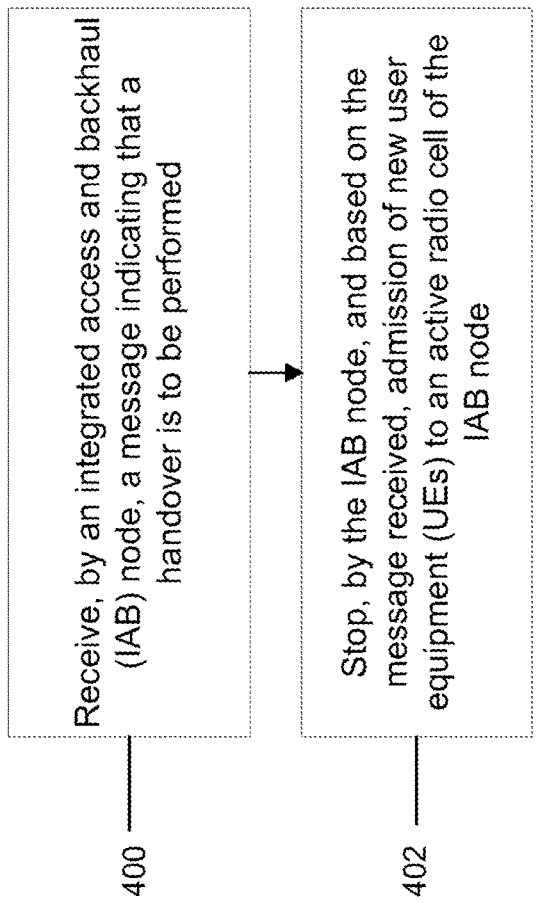
FIG. 4a illustrates an example flow diagram of a method, according to some embodiments described herein.

FIG. 4*a* illustrates an example flow diagram of a method, according to some embodiments described herein. For example, FIG. 4*a* illustrates example operations of an IAB node where the IAB node stops admitting new UEs to any currently active radio cells based on a received indication of HO. The operations may be similar to some operations shown in FIG. 1.

In an embodiment, the method may include, at 400, receiving, by an IAB node (e.g., by an integrated access and backhaul (IAB) mobile termination (MT) function of the IAB node (which may be referred to as IAB MT)), a message (e.g., a radio resource control (RRC) message) indicating that a handover is to be performed (e.g., in a manner similar to that described with respect to operation 107 of FIG. 1). In some embodiments, the message may be a RRC message that indicates a reconfiguration with synchronization.

In an embodiment, the method may include, at 402, stopping, by the IAB node (e.g., by an IAB distributed unit (DU) function of the IAB node), and based on the message received (e.g., by the IAB MT function), admission of new user equipment (UEs) to an active radio cell of the IAB node (e.g., in a manner similar to that described with respect to operation 112 of FIG. 1). In some embodiments, the IAB node may comprise a first IAB DU (DU_a) and a second IAB DU (DU_b). In some embodiments, an IAB DU of the IAB node performing the stopping operation may be the first IAB DU (DU_a).

In some embodiments, the method may include determining that the handover comprises an inter-gNB handover from a first gNB to a second gNB. In some embodiments, the method may include stopping admission of the new UEs based on determining that the handover comprises the inter-gNB handover. In some embodiments, the stopping admission of the new UEs occurs prior to stopping service for old UEs already admitted to the active radio cell.

As described above, FIG. 4*a* is provided as an example. Embodiments are not limited to the example of FIG. 4*a*.

FIG. 4*b* illustrates an example flow diagram of a method, according to some embodiments described herein. For example, FIG. 4*b* shows an example of a method where an IAB node adopts a conditional configuration based on receiving a trigger. The method illustrated in FIG. 4*b* may be similar to some operations shown in FIG. 2 and/or FIGS. 3*a*-3*b*.

In an embodiment, the method may include, at 404, receiving, by an integrated access and backhaul (IAB) node (e.g., a distributed unit (DU) function of the IAB node), a configuration command to adopt a configuration (e.g., in a manner similar to that described with respect to operation 204 of FIG. 2 and/or operation 304 of FIG. 3*a*). Adoption of the configuration may be conditional to receiving a trigger. In some embodiments, the configuration may be an F1 application protocol (F1AP) configuration. In some embodiments, the trigger may indicate to the IAB DU (DU_a) that an inter-gNB handover of the IAB MT is to be performed. In some embodiments, the trigger may indicate one of a plurality of possible values and the adoption of the configuration may be based on the value received in association with the trigger. In some embodiments, the trigger may be included in a command received by the IAB MT function. In some embodiments, the trigger may be included in at least one of a RRC message, a backhaul adaptation protocol (BAP) layer message, or a media access control control element (MAC CE). In some embodiments, the trigger may be a handover command or an inter-gNB handover command. In some embodiments, the configuration command may indicate that the configuration is associated with stopping admission of new user equipment (UEs) to an active radio cell of the IAB node.

In an embodiment, the method may include, at 406, receiving, by the IAB node (e.g., the IAB MT function of the IAB node), a communication that includes a trigger indicating that the configuration is to be adopted. For example, operation 406 may be performed in a manner similar to that described with respect to operation 212 of FIG. 2 and/or operation 312 of FIG. 3a. In an embodiment, the method may include, at 408, adopting, by the IAB node (e.g., an IAB distributed unit (DU) (DU_a) of the IAB node), the configuration based on the communication that includes the trigger having been received by the IAB node. For example, operation 408 may be performed in a manner similar to that described with respect to operation 216 of FIG. 2 and/or operation 316 of FIG. 3a.

As described above, FIG. 4b is provided as an example. Embodiments are not limited to the example of FIG. 4b.

Figure 5A:
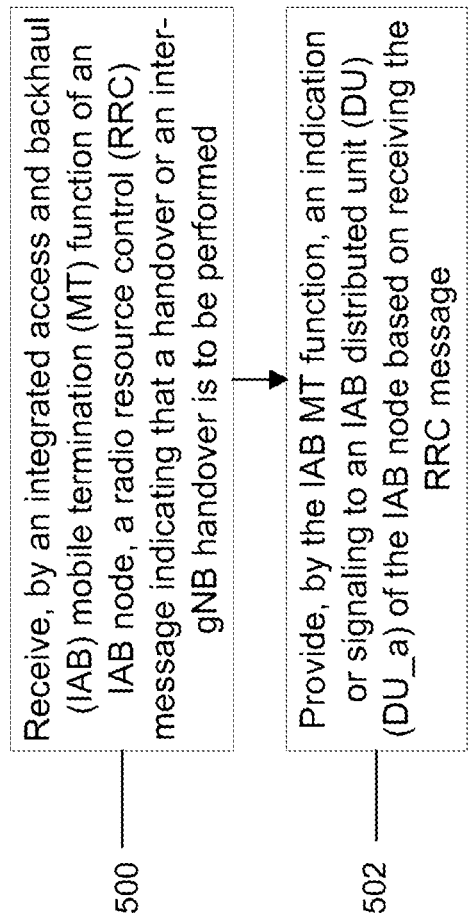
FIG. 5a illustrates an example flow diagram of a method, according to some embodiments described herein.

FIG. 5a illustrates an example flow diagram of a method, according to some embodiments described herein. For example, FIG. 5a illustrates example operations of an IAB MT function of an IAB node where the IAB MT uses an RRC handover command indicating a handover or an inter-gNB handover to cause an IAB DU to stop admitting new UEs to any currently active radio cells, similar to some operations shown in FIG. 1.

In an embodiment, the method may include, at 500, receiving, by an integrated access and backhaul (IAB) mobile termination (MT) function of an IAB node, a radio resource control (RRC) message indicating that a handover or an inter-gNB handover is to be performed. For example, the IAB MT function may receive the RRC message from a CU of a source BS (e.g., in a manner similar to that described with respect to operation 107 of FIG. 1).

In an embodiment, the method may include, at 502, providing, by the IAB MT function, an indication or signaling to an IAB distributed unit (DU) (DU_a) of the IAB node based on receiving the RRC message. For example, the IAB MT function may provide the indication or the signaling to the IAB DU after providing an RRC reconfiguration complete message to a CU of a target BS (e.g., in a manner similar to that described with respect to operation 111 of FIG. 1). In some embodiments, the indication or the signaling may indicate to the IAB DU (DU_a) to stop admitting new user equipment (UEs) to an active radio cell of the IAB DU (DU_a).

As described above, FIG. 5a is provided as an example. Embodiments are not limited to the example of FIG. 5a.

Figure 5B:
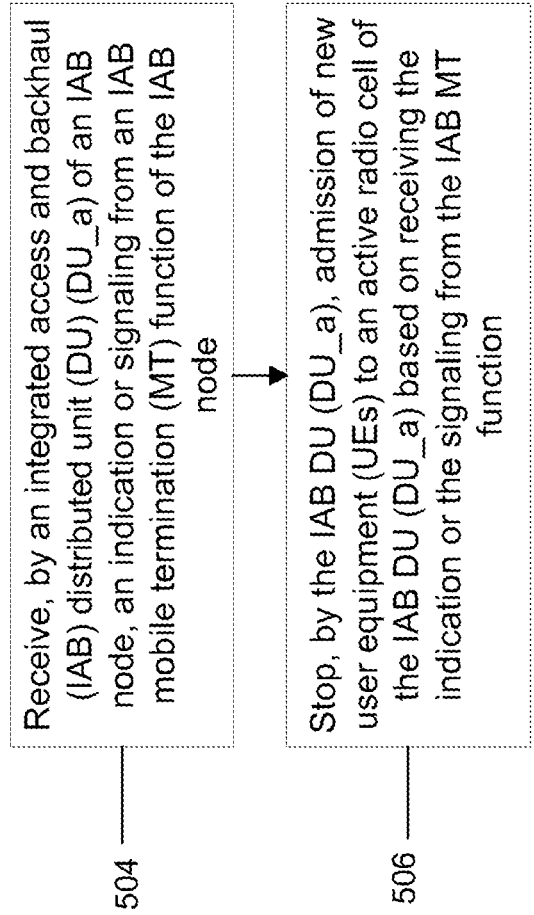
FIG. 5b illustrates an example flow diagram of a method, according to some embodiments described herein.

FIG. 5b illustrates an example flow diagram of a method, according to some embodiments described herein. For example, FIG. 5b illustrates example operations of an IAB DU, where an IAB MT function of an IAB node uses an RRC handover command indicating a handover or an inter-gNB handover to cause an IAB DU to stop admitting new UEs to any currently active radio cells, similar to some operations shown in FIG. 1.

In an embodiment, the method may include, at 504, receiving, by an integrated access and backhaul (IAB) distributed unit (DU) (DU_a) of an IAB node, an indication or signaling from an IAB mobile termination (MT) function of the IAB node. For example, the IAB DU may receive the indication or the signaling from the IAB MT after the IAB MT receives an RRC handover command (e.g., in a manner similar to that described with respect to operation 111 of FIG. 1). In some embodiments, the indication or the signaling may indicate that a handover or an inter-gNB handover is to be performed.

In an embodiment, the method may include, at 506, stopping, by the IAB DU (DU_a), admission of new user equipment (UEs) to an active radio cell of the IAB DU (DU_a) based on receiving the indication or the signaling from the IAB MT function. For example, the IAB DU may perform operations similar to that described with respect to operation 112 of FIG. 1. In some embodiments, the IAB DU may stop admitting new UEs prior to stopping providing service to connected UEs.

As described above, FIG. 5b is provided as an example. Embodiments are not limited to the example of FIG. 5b.

FIG. 6a illustrates an example flow diagram of a method, according to some embodiments described herein. For example, FIG. 6a shows an example of a method where an IAB DU is sent an F1AP command (e.g., to stop admitting new UEs), but this command is conditional to a trigger condition for which the IAB DU waits. A later command (e.g., a RRC handover command) to the IAB MT function may provide this trigger condition for the IAB MT function to pass to the IAB DU. The method illustrated in FIG. 6a may be similar to some operations shown in FIG. 2 and/or FIGS. 3a-3b.

In an embodiment, the method may include, at 600, providing, by an integrated access and backhaul (IAB) mobile termination (MT) function of an IAB node and to an IAB distributed unit (DU) (DU_a) of the IAB node, a configuration to be adopted by the IAB DU. In an embodiment, the IAB DU function may receive the configuration from a CU of a source BS (e.g., in a manner similar to operation 204 of FIG. 2 and/or to operation 304 of FIG. 3a) via the MT function. For example, the IAB MT function may provide the configuration in a manner similar to that described above with respect to operation 204 of FIG. 2 and/or operation 304 of FIG. 3a. In some embodiments, adoption of the configuration may be conditional to receiving a trigger.

In an embodiment, the method may include, at 602, receiving, by the IAB MT function, a communication that includes a trigger indicating that the configuration is to be adopted. For example, the IAB MT function may receive the communication that includes the trigger in a manner similar to that described with respect to operation 212 of FIG. 2 or operation 312 of FIG. 3a. In some embodiments, the trigger may be a handover command. In some embodiments, the handover command may be an RRC Reconfiguration message indicating reconfiguration with synchronization.

In an embodiment, the method may include, at 604, providing, by the IAB MT function, the trigger to the IAB DU (DU_a) of the IAB node based on receiving the communication that includes the trigger. For example, an IAB MT function may provide the trigger to the IAB DU in a manner similar to operation 215 of FIG. 2 and/or to operation 315 of FIG. 3a. The trigger may indicate to the IAB DU to adopt the configuration (e.g., a configuration associated with stopping admitting new UEs to an active radio cell of the IAB DU), where the configuration may have been received earlier in a manner similar to operation 204 of FIG. 2 and/or to operation 304 of FIG. 3a.

As described above, FIG. 6a is provided as an example. Embodiments are not limited to the example of FIG. 6a.

Figure 6B:
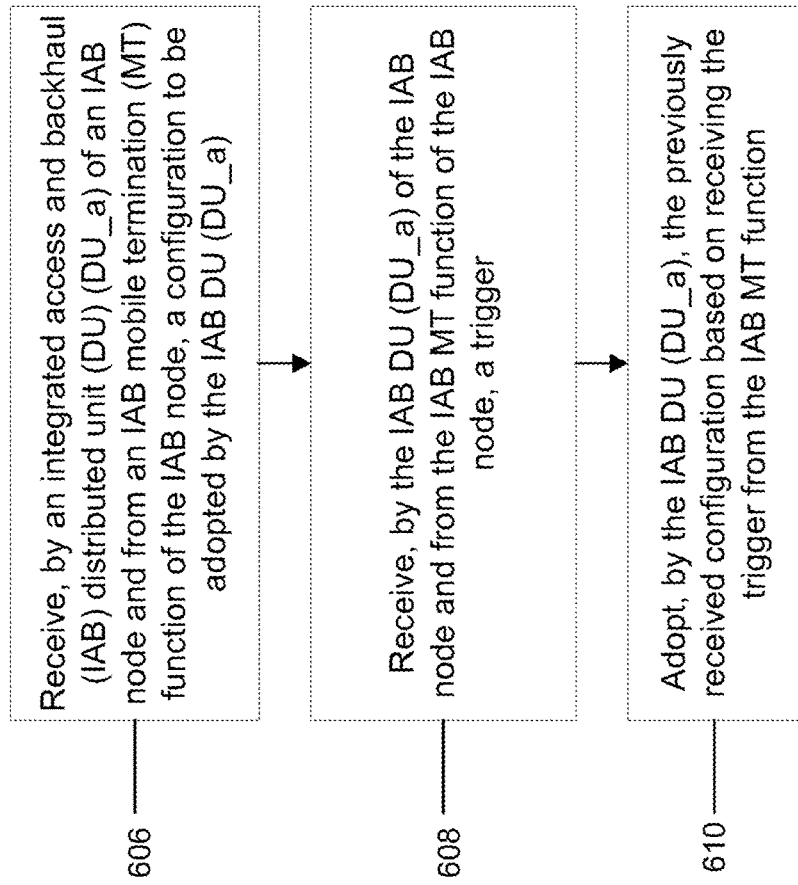
FIG. 6b illustrates an example flow diagram of a method, according to some embodiments described herein.

FIG. 6b illustrates an example flow diagram of a method, according to some embodiments described herein. For example, FIG. 6b illustrates example operations of an IAB DU with respect to the operations of an IAB MT illustrated in FIG. 6a (e.g., may illustrate some operations of an IAB DU similar to that of FIG. 2 and/or FIGS. 3a-3b).

In an embodiment, the method may include, at 606, receiving, by an integrated access and backhaul (IAB) distributed unit (DU) (DU_a) of an IAB node and from an IAB mobile termination (MT) function of the IAB node, a configuration to be adopted by the IAB DU (DU_a). For example, the IAB DU (DU_a) may receive the configuration in a manner similar to that described above with respect to operation 204 of FIG. 2 and/or operation 304 of FIG. 3a.

In an embodiment, the method may include, at 608, receiving, by the IAB DU (DU_a) of the IAB node and from the IAB MT function, a trigger. For example, an IAB DU may receive a trigger from an IAB MT in a manner similar to that described with respect to operation 215 of FIG. 2 and/or operation 315 of FIG. 3a. In some embodiments, the trigger may be associated with conditional adoption of the previously received configuration.

In an embodiment, the method may include, at 610, adopting, by the IAB DU (DU_a), the previously received configuration based on receiving the trigger from the IAB MT function. For example, the IAB DU may adopt the configuration in a manner similar to that described with respect to operation 216 of FIG. 2 and/or operation 316 of FIG. 3a.

As described above, FIG. 6b is provided as an example. Embodiments are not limited to the example of FIG. 6b.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, an IAB node, a Node B, an evolved Node B (eNB), 5G Node B or access point, next generation Node B (NG-NB or gNB), and/or a WLAN access point, associated with a radio access network, such as a LTE network, 5G or NR. For example, apparatus 10 may correspond to the IAB node, the donor gNB 1, and/or the donor gNB 2 of FIGS. 1-3b.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a. In some embodiments, where apparatus 10 represents an IAB node, it may be configured in a DU and MT architecture that divides the IAB functionality. In certain embodiments, the apparatus 10 may comprise more than one DUs.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

According to certain embodiments, apparatus 10 may be controlled by memory 14 and processor 12 to perform the functions associated with any of the embodiments described herein, such as some operations of flow or signaling diagrams illustrated in FIGS. 1-6b.

For instance, in one embodiment, apparatus 10 (e.g., an IAB node) may be controlled by memory 14 and processor 12 to receive (e.g., by an MT function of the IAB node) a message indicating that a handover is to be performed. In an embodiment, apparatus 10 may be controlled by memory 14 and processor 12 to stop (e.g., by an IAB DU of the IAB node), based on the message received, admission of new user equipment (UEs) to an active radio cell of the IAB node.

In some embodiments, apparatus 10 (e.g., the IAB node) may be controlled by memory 14 and processor 12 to determine (e.g., by a DU function of the IAB node) that the handover comprises an inter-gNB handover from a first gNB to a second gNB and to stop (e.g., by the DU function of the IAB node) admission of the new UEs based on determining that the handover comprises the inter-gNB handover. In some embodiments, the IAB node may comprise a first IAB DU (DU_a) and a second IAB DU (DU_b). The IAB DU performing the stopping operation may be the first IAB DU (DU_a). In some embodiments, the stopping admission of the new UEs may occur prior to stopping service for old UEs already admitted to the active radio cell. In some embodiments, the message may be a RRC message that indicates a reconfiguration with synchronization.

In another embodiment, apparatus 10 (e.g., an IAB node) may be controlled by memory 14 and processor 12 to receive (e.g., by an IAB MT function of the IAB node) a configuration command to adopt a configuration. In some embodiments, adoption of the configuration may be conditional to receiving a trigger. In an embodiment, apparatus 10 may be controlled by memory 14 and processor 12 to receive (e.g., by the IAB MT function of the IAB node) a communication that includes the trigger indicating that the configuration is to be adopted. In an embodiment, apparatus 10 may be controlled by memory 14 and processor 12 to adopt (e.g., by an IAB DU of the IAB node) the configuration based on the communication that includes the trigger having been received.

In some embodiments, the configuration may be an F1 application protocol (F1AP) configuration. In some embodiments, the trigger may indicate that an inter-gNB handover of the IAB MT is to be performed. In some embodiments, the trigger may indicate one of a plurality of possible values and the adoption of the configuration is based on the value received in association with the trigger. In some embodiments, the trigger may be included in a command received by the IAB MT function of the IAB node. In some embodiments, the trigger may be included in at least one of a RRC message, a backhaul adaptation protocol (BAP) layer message, or a media access control control element (MAC CE).

In some embodiments, apparatus 10 (e.g., an IAB node) may be controlled by memory 14 and processor 12 to provide (e.g., by an IAB MT of the IAB node) the trigger to another IAB DU associated with a target BS associated with the inter-gNB handover. The IAB DU may be associated with a source BS associated with the inter-gNB handover. In some embodiments, the trigger may be a handover command or an inter-gNB handover command. In some embodiments, the configuration command may indicate that the configuration is associated with stopping admission of new user equipment (UEs) to an active radio cell of the IAB node.

In another embodiment, apparatus 10 (e.g., an IAB node) may be controlled by memory 14 and processor 12 to receive (e.g., by an MT function of the IAB node) a radio resource control (RRC) message indicating that a handover or an inter-gNB handover is to be performed. In an embodiment, apparatus 10 (e.g., the IAB node) may be controlled by memory 14 and processor 12 to provide (e.g., by the IAB MT function) an indication or signaling to an IAB distributed unit (DU) (DU_a) of the IAB node based on receiving the RRC message. The indication or the signaling may indicate to the IAB DU (DU_a) to stop admitting new user equipment (UEs) to an active radio cell of the IAB DU (DU_a).

In another embodiment, apparatus 10 (e.g., an IAB node) may be controlled by memory 14 and processor 12 to receive (e.g., by an IAB DU (DU_a) of the IAB node) an indication or signaling from an IAB mobile termination (MT) function of the IAB node. In some embodiments, the indication or the signaling may indicate that a handover or an inter-gNB handover is to be performed. In an embodiment, apparatus 10 may be controlled by memory 14 and processor 12 to stop (e.g., by the IAB DU (DU_a)) admission of new user equipment (UEs) to an active radio cell of the IAB DU (DU_a) based on receiving the indication or the signaling from the IAB MT function.

In another embodiment, apparatus 10 (e.g., an IAB node) may be controlled by memory 14 and processor 12 to provide (e.g., by an IAB MT function of the IAB node), to a DU (DU_a) of the IAB node, a configuration to be adopted by the IAB DU. Adoption of the configuration may be conditional to reception of a communication that includes a trigger. In an embodiment, apparatus 10 may be controlled by memory 14 and processor 12 to receive (e.g., by the IAB MT function) the communication that includes the trigger indicating that the configuration is to be adopted. In an embodiment, apparatus 10 may be controlled by memory 14 and processor 12 to provide (e.g., by the IAB MT function) the trigger to the IAB DU (DU_a) of the IAB node based on receiving the trigger.

In another embodiment, apparatus 10 (e.g., an IAB node) may be controlled by memory 14 and processor 12 to receive (e.g., by an IAB DU (DU_a) of the IAB node), from an IAB mobile termination (MT) function of the IAB node, a configuration to be adopted by the IAB DU (DU_a). In some embodiments, the apparatus 10 may be controlled by memory 14 and processor 12 to receive (e.g., by the IAB DU of the IAB node) the configuration from a source BS (e.g., a source gNB) via the IAB MT function of the IAB node. In an embodiment, apparatus 10 (e.g., an IAB node) may be controlled by memory 14 and processor 12 to receive (e.g., by the IAB DU (DU_a) of the IAB node), from the IAB MT function, a trigger. The trigger may be associated with conditional adoption of the previously received configuration. In an embodiment, apparatus 10 may be controlled by memory 14 and processor 12 to adopt (e.g., by the IAB DU (DU_a)) the previously received configuration based on receiving the trigger from the IAB MT function.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-6*b*.

Therefore, certain example embodiments provide several technological improvements, enhancements, and/or advantages over existing technological processes. For example, one benefit of some example embodiments is reduction or elimination of RLF during an inter-gNB handover, thereby reducing or eliminating service interruption typically experienced by one or more types of network entities during such a handover. As another example, another benefit of some example embodiments is conservation of source and target gNB resources that would otherwise be consumed as a result of allowing formation of new UE connections to an active radio cell. Accordingly, the use of some example embodiments results in improved functioning of communications networks and their nodes and, therefore constitute an improvement at least to the technological field of wireless control and management, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

As used herein, the term "BS" may refer to a gNB, a NG-NB, an eNB, a Node B, or the like. In addition, the terms "BS," "gNB," "NG-NB," "eNB," "Node B," or the like may be used interchangeably.

A first embodiment may be directed to a method that may be implemented by an IAB node. The method may include receiving, by an IAB node, a message indicating that a handover is to be performed. The method may include stopping, by the IAB node, and based on the message received, admission of new user equipment (UEs) to an active radio cell of the IAB node.

In a variant, the method may include determining that the handover comprises an inter-BS handover from a first BS to a second BS and stopping admission of the new UEs based on determining that the handover comprises the inter-BS handover. In a variant, the IAB node may comprise a first IAB DU and a second IAB DU. In a variant, the IAB DU performing the stopping operation is the first IAB DU. In a variant, the stopping admission of the new UEs occurs prior to stopping service for old UEs already admitted to the active radio cell. In a variant, the message may be a RRC message that indicates a reconfiguration with synchronization. In a variant, the inter-BS handover is an inter-gNB handover from a first gNB to a second gNB.

A second embodiment may be directed to a method that may be implemented by a network node. The method may include receiving, by an integrated access and backhaul (IAB) node, a configuration command to adopt a configuration. Adoption of the configuration may be conditional to receiving of a trigger. The method may include receiving, by the IAB node, the trigger indicating that the configuration is to be adopted. The method may include adopting, by an IAB node, the configuration based on the trigger having been received.

In a variant, the configuration may be an F1 application protocol (F1AP) configuration. In a variant, the trigger may indicate that a handover or an inter-BS handover is to be performed by an MT function of the IAB node. In a variant, the trigger may indicate one of a plurality of possible values and the adoption of the configuration may be based on the value received in association with the trigger. In a variant, the trigger may be included in a command received by the IAB MT function. In a variant, the trigger may be included in at least one of a RRC message, a backhaul adaptation protocol (BAP) layer message, or a media access control control element (MAC CE). In a variant, the method may include providing the trigger to another IAB DU associated with a target BS associated with the inter-BS handover. In a variant, the IAB DU may be associated with a source BS associated with the inter-BS handover. In a variant, the trigger may be a handover command or an inter-BS handover command. In a variant, the configuration command may indicate that the configuration is associated with stopping admission of new user equipment (UEs) to an active radio cell of the IAB node. In a variant, the inter-BS handover is an inter-gNB handover. In a variant, the inter-BS handover command is an inter-gNB handover command.

A third embodiment may be directed to a method that may be implemented by an IAB MT function. The method may include receiving, by an integrated access and backhaul (IAB) mobile termination (MT) function of an IAB node, a message (e.g., a radio resource control (RRC) message) indicating that a handover or an inter-BS handover (e.g., an inter-gNB handover) is to be performed. The method may include providing, by the IAB MT function, an indication or signaling to an IAB distributed unit (DU) of the IAB node based on receiving the RRC message. The indication or the signaling may indicate to the IAB DU to stop admitting new user equipment (UEs) to an active radio cell of the IAB DU.

A fourth embodiment may be directed to a method that may be implemented by an IAB DU. The method may include receiving, by an integrated access and backhaul (IAB) distributed unit (DU) of an IAB node, an indication or signaling from an IAB mobile termination (MT) function of the IAB node. The indication or the signaling may indicate that a handover or an inter-BS handover (e.g., an inter-gNB handover) is to be performed. The method may include stopping, by the IAB DU, admission of new user equipment (UEs) to an active radio cell of the IAB DU based on receiving the indication or the signaling from the IAB MT function.

A fifth embodiment may be directed to a method that may be implemented by an IAB MT function. The method may include providing, by an integrated access and backhaul (IAB) mobile termination (MT) function of an IAB node and to a distributed unit (DU) (DU_a) of the IAB node, a configuration to be adopted by the IAB DU. The MT function may have received the configuration from a source BS. Adoption of the configuration by the DU may be conditional to reception of a communication that includes a trigger. The method may include receiving, by the IAB MT function, a communication that includes the trigger indicating that the configuration is to be adopted. The method may include providing, by the IAB MT function, the trigger to the IAB DU of the IAB node based on receiving the communication that includes the trigger.

A sixth embodiment may be directed to a method that may be implemented by an IAB DU. The method may include receiving, by an integrated access and backhaul (IAB) distributed unit (DU) of an IAB node, a configuration to be adopted by the IAB DU (DU_a). In some embodiments, the DU of the IAB node may receive the configuration from a source BS via an MT of the IAB node. The method may include receiving, by the IAB DU (DU_a) of the IAB node and from the IAB MT function, a trigger. The trigger may be associated with conditional adoption of the previously received configuration. The method may include adopting, by the IAB DU, the previously received configuration based on receiving the trigger from the IAB MT function.

A seventh embodiment is directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, the fourth embodiment, the fifth embodiment, or the sixth embodiment, or any of the variants discussed above.

An eighth embodiment is directed to an apparatus that may include circuitry configured to perform the method according to the first embodiment, the second embodiment, the third embodiment, the fourth embodiment, the fifth embodiment, or the sixth embodiment, or any of the variants discussed above.

A ninth embodiment is directed to an apparatus that may include means for performing the method according to the first embodiment, the second embodiment, the third embodiment, the fourth embodiment, the fifth embodiment, or the sixth embodiment, or any of the variants discussed above.

A tenth embodiment is directed to a computer readable medium comprising program instructions stored thereon for performing at least the method according to the first embodiment, the second embodiment, the third embodiment, the fourth embodiment, the fifth embodiment, or the sixth embodiment, or any of the variants discussed above.

The invention claimed is:
1. A method, comprising:
receiving, by an integrated access and backhaul node, a command to adopt a configuration conditionally, wherein the configuration comprises an F1 application protocol configuration, and wherein the configuration is associated with stopping admission of new user equipment to an active radio cell of the integrated access and the backhaul node;

receiving, by the integrated access and backhaul node, a trigger indicating that the configuration is to be adopted, wherein the trigger includes a trigger identifier associated with the configuration to be adopted, wherein the trigger is included in a command received by a mobile termination function of the integrated access and backhaul node, and wherein receiving the trigger comprises:
   receiving a backhaul adaptation protocol layer message including an indication that a handover is to be performed by a mobile termination function of the integrated access and backhaul node;
adopting, by the integrated access and backhaul node, the configuration based on the trigger received;
determining that the handover includes an inter-gNB handover from a first gNB to a second gNB; and
stopping, by a backhaul node distributed unit function of the backhaul node, and based on the message received, admission of the new user equipment to the active radio cell of the backhaul node, wherein the backhaul node distributed unit function of the backhaul node performing the stopping is a first backhaul node distributed unit function,
wherein stopping admission of the new user equipment based on determining that the handover includes the inter-gNB handover, wherein the stopping admission of the new user equipment occurs prior to stopping service for old user equipment already admitted to the active radio cell.

* * * * *